US008833190B2

(12) United States Patent
Hsu et al.

(10) Patent No.: US 8,833,190 B2
(45) Date of Patent: Sep. 16, 2014

(54) RELATIVE-ROTATION SYNCHRONOUS MOVEMENT-AID DEVICE

(75) Inventors: An Szu Hsu, New Taipei (TW); Way Han Dai, New Taipei (TW); Hsiu Fan Ho, New Taipei (TW)

(73) Assignee: First Dome Corporation, New Taipei (TW)

( * ) Notice: Subject to any disclaimer, the term of this patent is extended or adjusted under 35 U.S.C. 154(b) by 304 days.

(21) Appl. No.: 13/345,820

(22) Filed: Jan. 9, 2012

(65) Prior Publication Data

US 2013/0174677 A1    Jul. 11, 2013

(51) Int. Cl.
*F16H 21/16*         (2006.01)
(52) U.S. Cl.
USPC ............... 74/89; 74/101; 455/575.4; 49/351; 379/433.12
(58) Field of Classification Search
USPC ............ 74/89, 89.16, 89.17, 98, 99 R, 100.1, 74/101, 110, 107, 406, 412–416, 27, 74/35–55; 455/575.1–575.9, 90.1–90.3, 455/342, 344, 346–350; 720/615, 613, 619, 720/620, 622; 49/351, 128–130, 176; 379/433.12; 296/223
See application file for complete search history.

(56) References Cited

U.S. PATENT DOCUMENTS

| 1,651,870 | A | * | 12/1927 | Clas | 49/351 |
| 1,943,359 | A | * | 1/1934 | Ackerman | 49/351 |
| 1,961,507 | A | * | 6/1934 | Nicholson | 74/89.19 |
| 2,017,244 | A | * | 10/1935 | Gudmundsen | 16/200 |
| 2,412,222 | A | * | 12/1946 | Kessler | 74/46 |
| 3,508,362 | A | * | 4/1970 | Wright | 49/340 |
| 4,119,341 | A | * | 10/1978 | Cook | 296/146.16 |
| 7,926,370 | B2 | * | 4/2011 | Kawabuchi et al. | 74/22 R |
| 2007/0193398 | A1 | * | 8/2007 | Kawabuchi et al. | 74/530 |
| 2008/0229344 | A1 | * | 9/2008 | Yamanaka | 720/620 |
| 2008/0229345 | A1 | * | 9/2008 | Shukuya | 720/620 |
| 2008/0232070 | A1 | * | 9/2008 | Kuwajima et al. | 361/727 |
| 2010/0177020 | A1 | * | 7/2010 | Bemelmans et al. | 345/55 |

* cited by examiner

*Primary Examiner* — Troy Chambers
*Assistant Examiner* — Valentin Craciun
(74) *Attorney, Agent, or Firm* — Rosenberg, Klein & Lee

(57) ABSTRACT

A relative-rotation synchronous movement-aid device, which has a simple structure and is easy to assemble. The synchronous movement-aid device includes a linking arm and a rotational wheel assembled with the linking arm. The linking arm has a pivoted end and a free end mounted on the rotational wheel. The pivoted end is mounted on a rail. When an external force is applied to the linking arm, the pivoted end can freely move along the rail. The free end serves to make the rotational wheel relatively rotate along with the movement of the linking arm to achieve better synchronous movement effect than the conventional slide mechanism.

14 Claims, 5 Drawing Sheets

RELATIVE-ROTATION SYNCHRONOUS MOVEMENT-AID DEVICE

BACKGROUND OF THE INVENTION

1. Field of the Invention

The present invention relates generally to a synchronous slide-aid device for electronic apparatus, and more particularly to a relative-rotation synchronous movement-aid device including a linking arm and a rotational wheel assembled with the linking arm. The relative-rotation synchronous movement-aid device is mounted on a slidable or movable apparatus body. In operation, the relative-rotation synchronous movement-aid device serves to increase the synchronous movement effect and operational stability of the slide device. Accordingly, the problems of elastic fatigue and difficulty in controlling the assembling quality with the conventional transmission belt are overcome.

2. Description of the Related Art

It is known that various freely reciprocally movable or slidable slide cover systems have been developed and applied to different electronic devices such as mobile phones, laptops, PDA, digital imagers and electronic books. The slide cover can be moved and opened/closed.

The above slide cover module or slide cover assembly generally includes a movable frame, a linking board, multiple elastic members, linking wires and guide rails with specific configurations. These components cooperate with each other to help in opening/closing the slide cover. In the case that such slide cover module is applied to a relatively heavyweight electronic product necessitating longer movement distance, when operated, (for example, when a lateral push force is applied to one single side of the slide cover assembly), the slide cover assembly or mechanism tends to shake or deflect to affect the stability of movement of the slide cover assembly.

In order to solve the problem of shake or deflection of the slide cover assembly or mechanism, a slide cover assembly with wires or transmission belt for helping in sliding the slide cover has been developed. In such device, a first transmission unit and a second transmission unit are respectively arranged on two sides of the electronic apparatus. The first and second transmission units are composed of idlers. A transmission belt is wound around the first and second transmission units. When pushing the slide cover module to move, the transmission belt and the first and second transmission units cooperate with each other to keep the slide mechanism synchronously moving so as to avoid deflection or shake of the slide cover module.

In the above slide cover mechanism, the wires or transmission belt is elastic. Therefore, in the cooperative driving process, the transmission of kinetic energy will be delayed. As a result, the slide cover module will still deflect or shake. Especially, after a period of use, the original preset force of the assembled wires or transmission belt will decline due to elastic fatigue. This will lead to deterioration of the synchronous movement effect of the transmission mechanism.

In practice, in case of more serious elastic fatigue of the wires or transmission belt, the wires or transmission belt may detach from the idlers or rollers during sliding operation of the slide cover module. Under such circumstance, the slide device will lose its synchronous movement effect.

Moreover, as well known by those skilled in this field, when assembled, the wires or transmission belt needs to be in a tensioned state. This causes more difficult in controlling the quality in wiring and assembling process. As a result, the ratio of good products can be hardly increased and the assembling time can be hardly shortened. Accordingly, the manufacturing cost for the product is increased.

It is therefore tried by the applicant to provide a relative-rotation synchronous movement-aid device to overcome the above shortcomings existing in the conventional slide cover module. The synchronous movement-aid device includes specifically designed transmission mechanism and cooperative structures to eliminate the problem of delay of transmission of kinetic energy with the wires or transmission belt. In practice, not only the problem of shake or deflection of the slide cover is solved, but also the synchronous movement effect and operational stability of the slide device are increased.

SUMMARY OF THE INVENTION

It is therefore a primary object of the present invention to provide a relative-rotation synchronous movement-aid device, which has a simple structure and is easy to assemble. The synchronous movement-aid device includes a linking arm and a rotational wheel assembled with the linking arm. The linking arm has a pivoted end and a free end mounted on the rotational wheel. The pivoted end is mounted on a rail. When an external force is applied to the linking arm, the pivoted end can freely move along the rail. The free end serves to make the rotational wheel relatively rotate along with the movement of the linking arm to achieve better synchronous movement effect than the conventional slide mechanism.

It is a further object of the present invention to provide the above relative-rotation synchronous movement-aid device in which the rotational wheel has a pillar and the linking arm is formed with a slot corresponding to the pillar for detaining the pillar therein. The pillar is freely movable within the slot.

It is still a further object of the present invention to provide the above relative-rotation synchronous movement-aid device, which includes a left linking arm and a right linking arm, a left rotational wheel and a right rotational wheel, and a left transmission wheel and a right transmission wheel. The left rotational wheel is engaged with the left transmission wheel and the left transmission wheel is engaged with the right transmission wheel, while the right transmission wheel is engaged with the right rotational wheel. When a user applies an external force to one single side of a slide cover or a slide module to move the same, the left (or right) linking arm is moved. Via the left (or right) rotational wheel, the left (or right) transmission wheel, the right (or left) transmission wheel and the right (or left) rotational wheel, the right (or left) linking arm is driven to synchronously move. Accordingly, the problems of delay of transmission of kinetic energy due to elastic fatigue and difficulty in controlling the assembling quality with the conventional wires or transmission belt are overcome.

The present invention can be best understood through the following description and accompanying drawings, wherein:

DETAILED DESCRIPTION OF THE PREFERRED EMBODIMENTS

Figure 1:
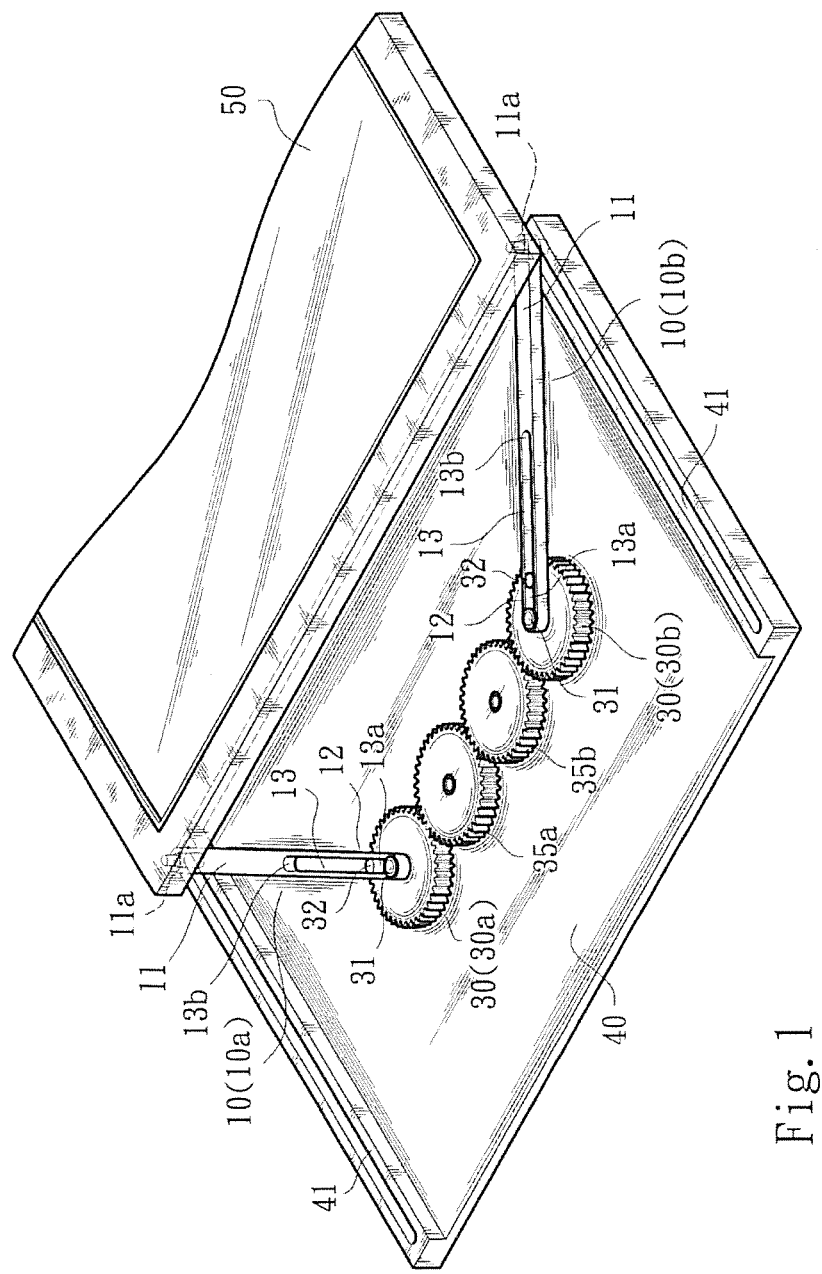
FIG. 1 is a perspective assembled view of the present invention.
Figure 2:
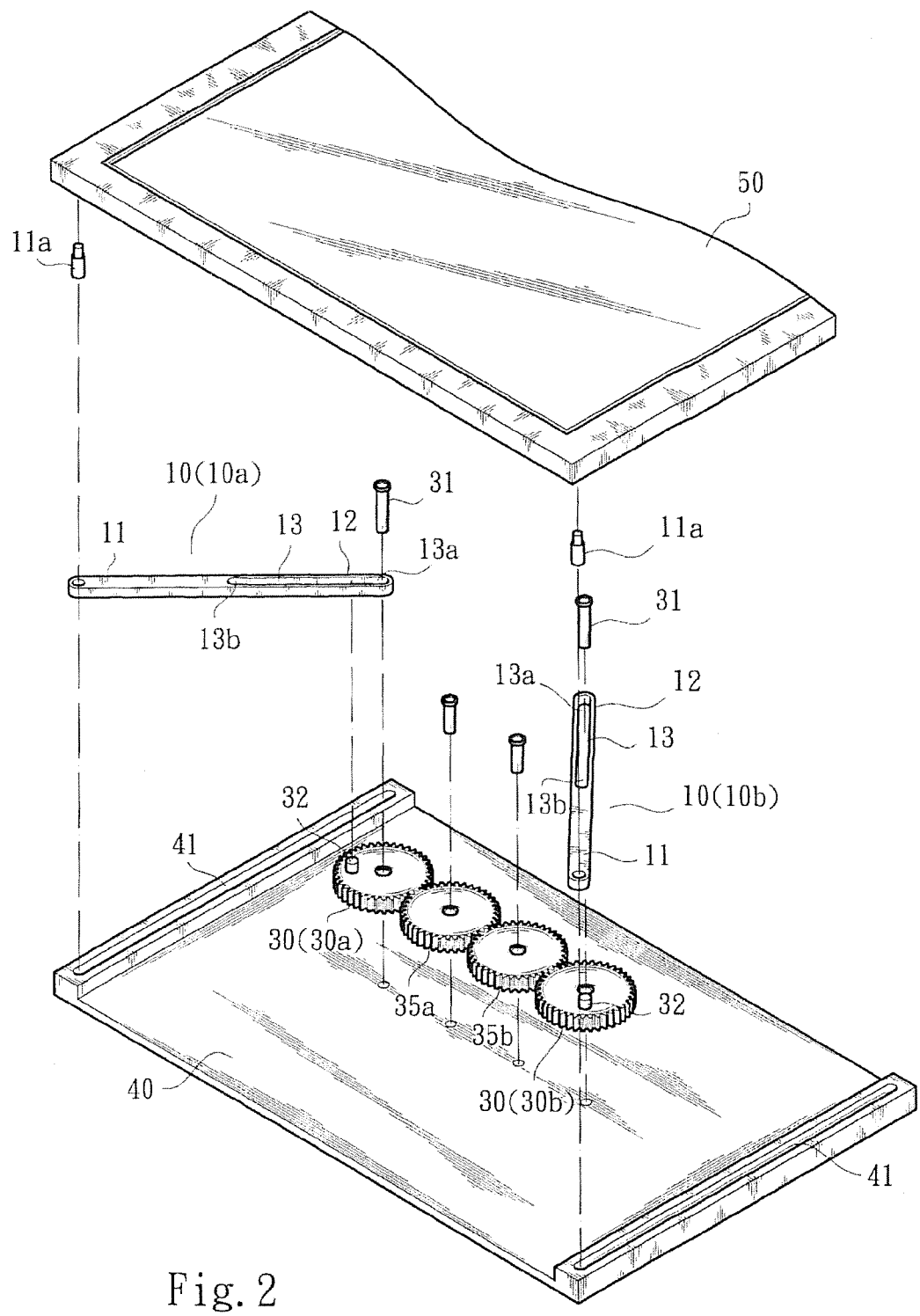
FIG. 2 is a perspective exploded view of the present invention according to FIG. 1.

Please refer to FIGS. 1 and 2. The relative-rotation synchronous movement-aid device of the present invention includes a linking arm 10 and a rotational wheel 30 assembled with the linking arm 10. The linking arm 10 has a pivoted end 11 and a free end 12. The free end 12 is assembled with the rotational wheel 30. The linking arm 10 and the rotational wheel 30 are mounted on a fixed apparatus body of an electronic apparatus. As shown in the drawings, the linking arm 10 and the rotational wheel 30 are mounted on a substrate 40 of the fixed apparatus body.

In a preferred embodiment, there are a left linking arm 10a and a right linking arm 10b and there are a left rotational wheel 30a and a right rotational wheel 30b. The linking arms 10a, 10b and the rotational wheels 30a, 30b are left and right symmetrically arranged.

Referring to FIGS. 1 and 2, a rail 41 is disposed on each of two sides of the substrate 40. The pivoted end 11 of the linking arm 10 (or 10a, 10b) is positioned on the rail 41. In a preferred embodiment, the pivoted end 11 is pivotally connected with the rail 41 or has the form of a pivot pin 11a. When an external force is applied to the linking arm 10, the pivoted end 11 can freely move along the rail 41 relative to the rotational wheel 30. (This will be further described hereinafter).

In a modified embodiment, as shown in FIGS. 1 and 2, the left rotational wheel 30a is engaged with a left transmission wheel 35a. The left transmission wheel 35a is engaged with a right transmission wheel 35b. The right transmission wheel 35b is engaged with the right rotational wheel 30b.

The rotational wheel 30 (or 30a, 30b) has a shaft 31 disposed at a circular center of the rotational wheel 30 (or 30a, 30b). The rotational wheel 30 (or 30a, 30b) further has a pillar 32 eccentrically formed on the rotational wheel 30 (or 30a, 30b). The pillar 32 helps in driving the rotational wheel 30 (or 30a, 30b) to rotate when the linking arm 10 (or 10a, 10b) moves. The linking arm 10 (or 10a, 10b) is formed with a slot 13 corresponding to the pillar 32 (or the shaft 31) for detaining the pillar 32 therein. The pillar 32 (or the shaft 31) is permitted to freely relatively move within the slot 13.

In this embodiment, the slot 13 is formed on the linking arm 10 (or 10a, 10b) between the pivoted end 11 and the free end 12. The slot 13 has a first end 13a and a second end 13b. To speak more specifically, the slot 13 extends from the free end 12 to a middle section of the linking arm 10 (or 10a, 10b). Accordingly, the slot 13 has a length about one half of the length of the linking arm 10 (or 10a, 10b). It should be noted that the length of the slot 13 is modifiable as necessary.

FIG. 1 specifically shows that the shaft 31 and the pillar 32 of the rotational wheel 30 (or 30a, 30b) are positioned in the slot 13 near the first end 13a.

Figure 3:
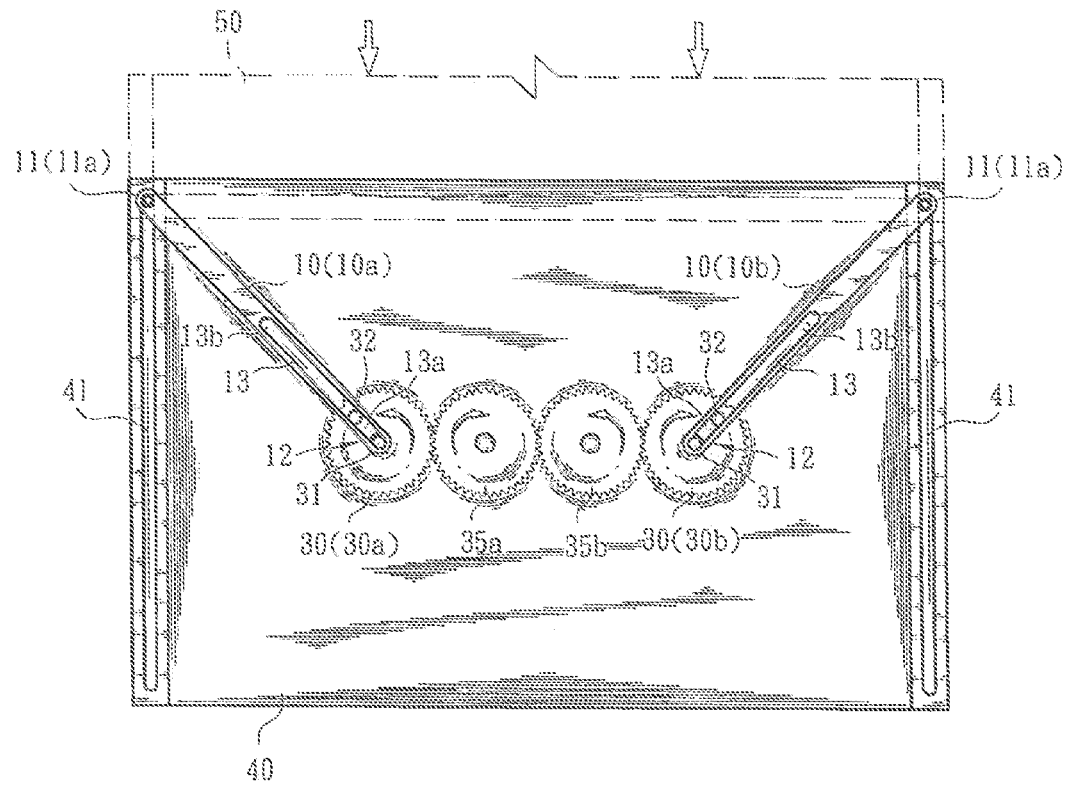
FIG. 3 is a plane view of the present invention according to FIG. 1, in which the rotational wheels rotate in a direction as indicated by the arrows and the movable apparatus body is positioned in an opened position as shown by the phantom line.
Figure 4:
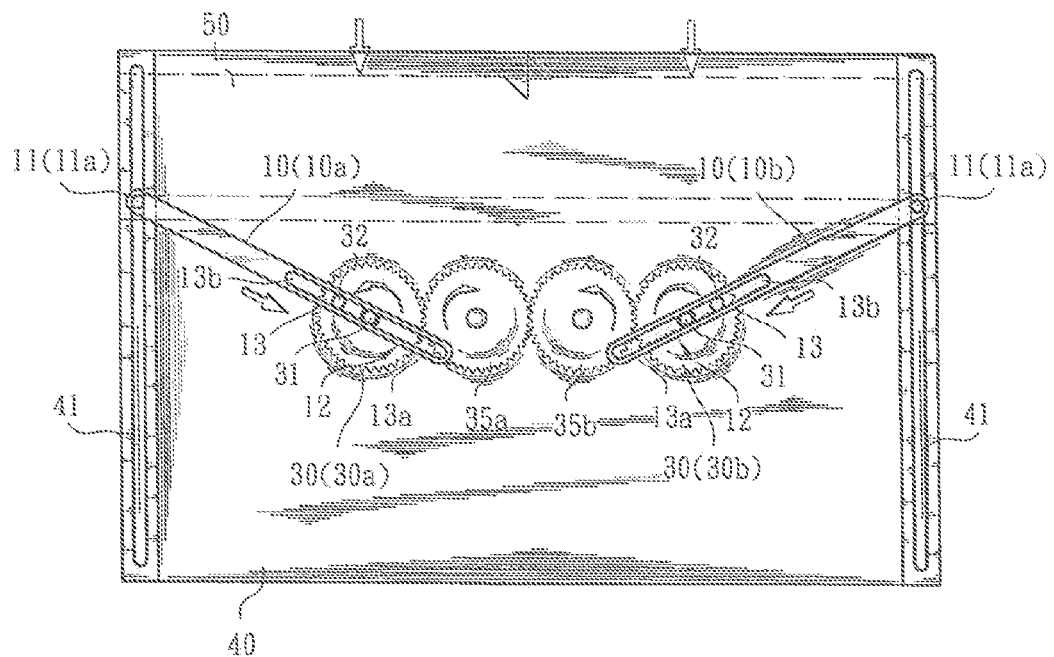
FIG. 4 is a plane view of the present invention according to FIG. 3, showing the operation of the present invention and the movement of the linking arms, in which the rotational wheels rotate in a direction as indicated by the arrows.

FIGS. 3 and 4 shows the movement of a movable apparatus body 50 (such as a slide cover or slide module) and the cooperative substrate 40 of the fixed apparatus body. The movable apparatus body 50 is pivotally connected with the pivoted end 11 of the linking arm 10 (or 10a, 10b). FIG. 3 shows that the movable apparatus body 50 is positioned in an opened position.

Figure 5:
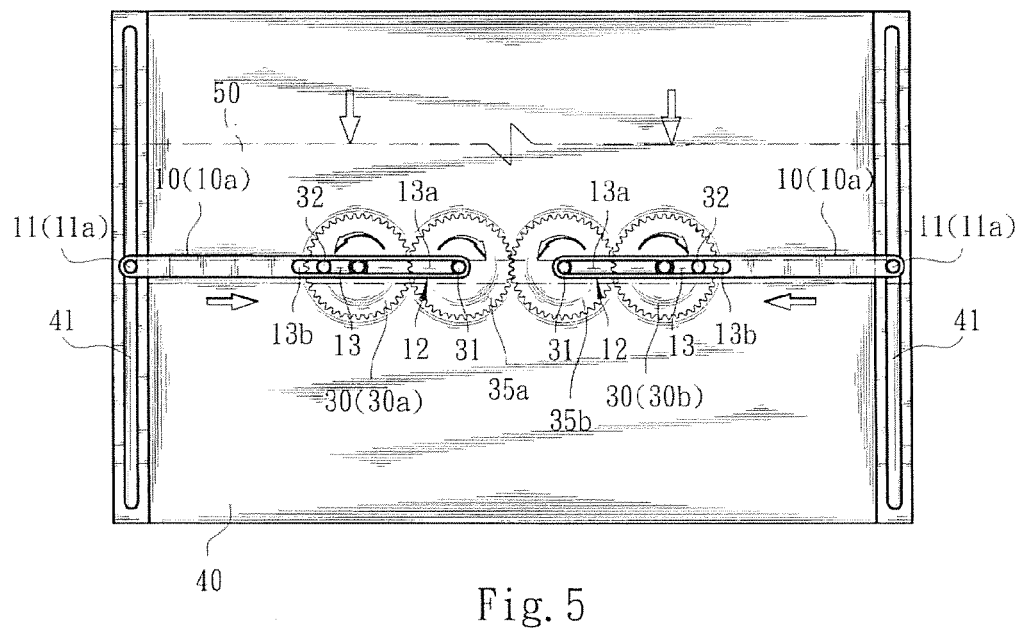
FIG. 5 is still a plane view of the present invention according to FIG. 3, showing the operation of the present invention and the movement of the linking arms, in which the rotational wheels rotate in a direction as indicated by the arrows.

When a user operates the movable apparatus body 50 to move toward a lower side of the drawing, the pivoted end 11 of the linking arm 10 (or 10a, 10b) is driven to move along the rail 41 toward the lower side of the drawing. Along with the change of angle and position of the linking arm 10 (or 10a, 10b), the linking arm 10 (or 10a, 10b) and the rotational wheel 30 move in a manner as follows:

1. The pillar 32 (or shaft 31) of the rotational wheel 30 (or 30a, 30b) relatively moves within the slot 13 of the linking arm 10 (10a, 10b) from the first end 13a to the second end 13b as shown in FIGS. 4 and 5.
2. The linking arm 10 (or 10a, 10b) pushes the pillar 32 (or the shaft 31) to make the left rotational wheel 30a counterclockwise rotate in a direction as indicated by the arrow. FIG. 3 also shows that the left and right rotational wheels 30a, 30b are respectively engaged with the left and right transmission wheels 35a, 35b. Therefore, when the left rotational wheel 30a counterclockwise rotates, the left transmission wheel 35a clockwise rotates, whereby the right transmission wheel 35b counterclockwise rotates as shown in FIGS. 4 and 5.

Figure 6:
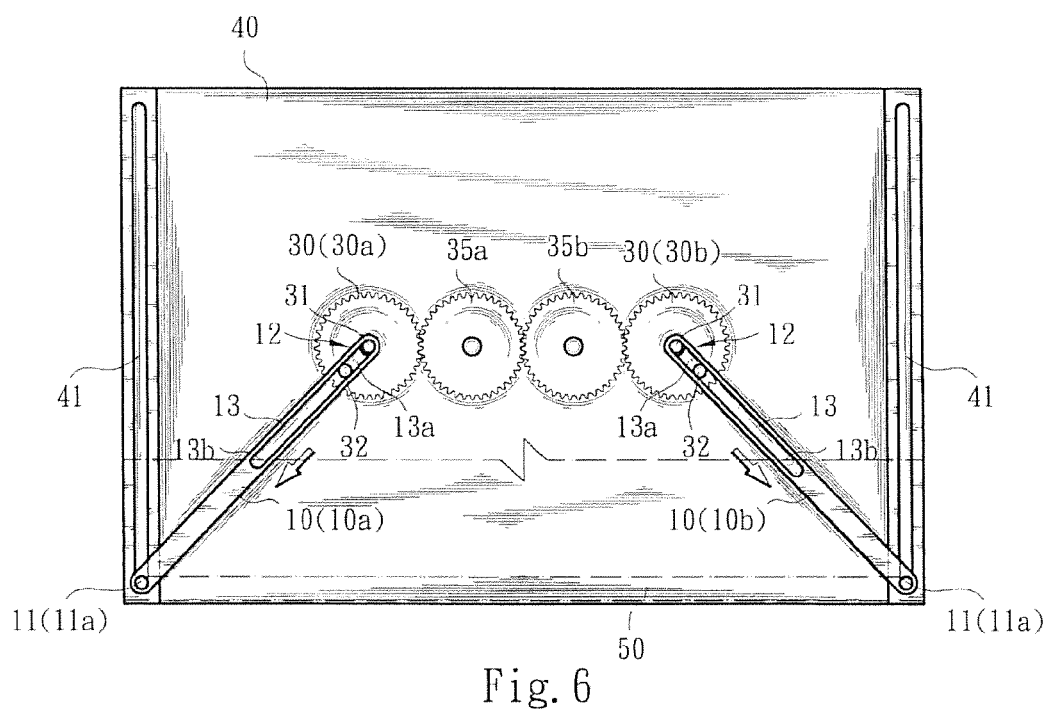
FIG. 6 is still a plane view of the present invention according to FIG. 3, showing the operation of the present invention and the movement of the linking arms, in which the rotational wheels rotate in a direction as indicated by the arrows and the movable apparatus body is positioned in a closed position as shown by the phantom line.

FIG. 6 shows that the movable apparatus body 50 reaches the end of the rail 41 and is positioned in a closed position. When the movable apparatus body 50 further moves from the position as shown in FIG. 5 to the position as shown in FIG. 6, the linking arm 10 (or 10a, 10b) moves in a direction as indicated by the arrow of FIG. 6. At this time, the pillar 32 (or shaft 31) relatively moves within the slot 13 from the second end 13b to the first end 13a.

Figure 7:
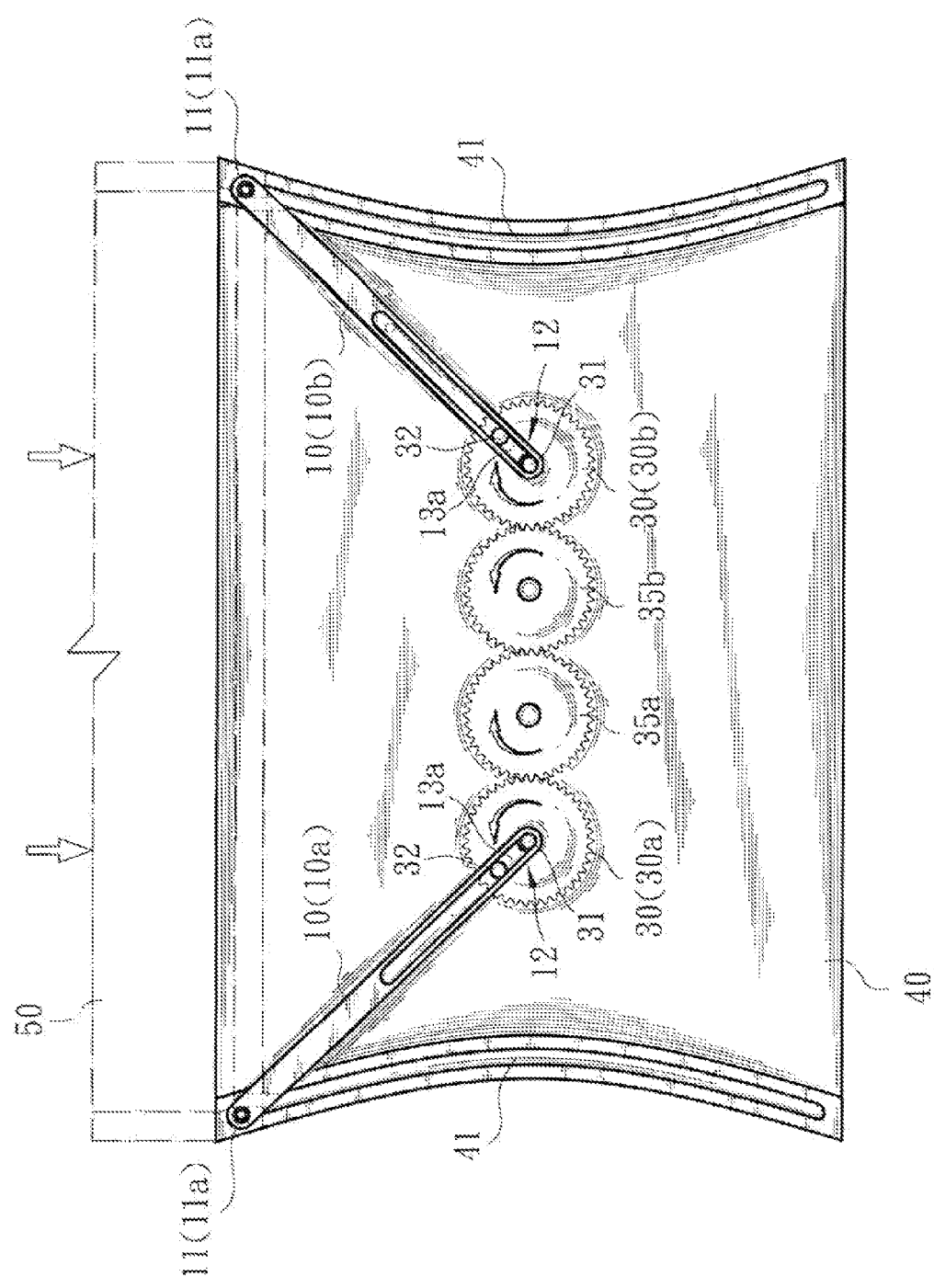
FIG. 7 is a plane view of an alternate embodiment, in which the rotational wheels rotate in a direction as indicated by the arrows and the movable apparatus body is positioned in an opened position as shown by the phantom line.

In the above embodiment, the rails 41 disposed on the substrate 40 have a linear form. In a modified embodiment shown in FIG. 7, the rails 41 have an arcuate or curved form. Along with the movement of the pivoted end 11 of the linking arm in such a path, the linking arm 10 (or 10a, 10b) can still relatively move along the rails 41.

It should be noted that the linking arm 10 (or 10a, 10b) and the left and right rotational wheels 30a, 30b and/or the left and right transmission wheels 35a, 35b together form a rigid assembly. When an external force is applied to one single side of the movable apparatus body 50 to move the same, the linking arm 10a (or 10b) is relatively moved. Via the left rotational wheel 30a (or the right rotational wheel 30b), the right rotational wheel 30b (or the left rotational wheel 30a) is driven to rotate. At this time, the linking arm 10a (or 10b) is synchronously moved with the operation of the movable apparatus body 50. This overcomes the problem existing in the conventional device that the slide mechanism can hardly truly synchronously move.

According to the above arrangement, in comparison with the conventional device, the relative-rotation synchronous movement-aid device of the present invention helps in operating and moving the slide cover module or the movable apparatus body 50 and has the following advantages:

1. The relative-rotation synchronous movement-aid device of the present invention is advantageous over the conventional device in that along with the change of angle and position, the linking arm 10 (or 10a, 10b) can relatively move in a path according to the rail 41. The left and right rotational wheels 30a, 30b and/or the left and right transmission wheels 35a, 35b are engaged with each other, whereby the linking arm 10 (or 10a, 10b) can synchronously move. With the above mechanism, the wires or transmission belt and their cooperative mechanisms of the conventional device for transmitting kinetic energy are omitted.

2. The usage of the relative-rotation synchronous movement-aid device of the present invention is different from the conventional device in that the angle and position of the linking arm 10 (or 10a, 10b) is varied with its movement path. The pillars 32 (or shafts 31) of the left and right rotational wheels 30a, 30b synchronously move within the slots 13 of the linking arms 10a, 10b. Accordingly, an effective transmission mechanism is provided to overcome the problem of delay of transmission of kinetic energy with the conventional wires or transmission belt. Especially, the relative-rotation synchronous movement-aid device of the present invention solves the problem of shake or deflection with the conventional device and increases the synchronous movement effect and operational stability of the slide mechanism.

3. In the conventional device, after a period of use, the original preset force of the assembled wires or transmission belt will decline due to elastic fatigue. This will lead to deterioration of the synchronous movement effect of the transmission mechanism. In practice, in case of more serious elastic fatigue of the wires or transmission belt, the wires or transmission belt may detach from the idlers or rollers during sliding operation of the slide cover module. Under such circumstance, the slide device will lose its synchronous movement effect. In contrast, in the relative-rotation synchronous movement-aid device of the present invention, the linking arm 10 (or 10a, 10b) and the left and right rotational wheels 30a, 30b and/or the left and right transmission wheels 35a, 35b together form a rigid assembly to overcome the above problems with the conventional device.

4. In the conventional device, when assembled, the wires or transmission belt needs to be in a tensioned state. This causes more difficult in controlling the quality in wiring and assembling process. As a result, the ratio of good products can be hardly increased and the assembling time can be hardly shortened. Accordingly, the manufacturing cost for the product is increased. In contrast, in the relative-rotation synchronous movement-aid device of the present invention, the linking arm 10 (or 10a, 10b) and the left and right rotational wheels 30a, 30b and/or the left and right transmission wheels 35a, 35b together form a rigid assembly. The pillars 32 (or shafts 31) of the left and right rotational wheels 30a, 30b synchronously move within the slots 13 of the linking arms 10a, 10b. Such structure is simple and the assembling process is easy to perform.

The above embodiments are only used to illustrate the present invention, not intended to limit the scope thereof. Many modifications of the above embodiments can be made without departing from the spirit of the present invention.

What is claimed is:

1. A relative-rotation synchronous movement-aid device comprising a linking arm and a rotational wheel assembled with the linking arm, the linking arm having a pivoted end and a free end mounted on the rotational wheel, the free end serving to make the rotational wheel relatively rotate along with the movement of the linking arm;
   wherein the rotational wheel has a shaft disposed at a circular center of the rotational wheel, the rotational wheel further having a pillar eccentrically formed on the rotational wheel, the linking arm being formed with a slot corresponding to the pillar for detaining the pillar or the shaft therein, whereby the pillar or the shaft is relatively freely movable within the slot;
   wherein the slot is formed on the linking arm between the pivoted end and the free end, the slot having a first end and a second end; and
   wherein the shaft and the pillar of the rotational wheel are positioned in the slot near the first end.

2. The relative-rotation synchronous movement-aid device as claimed in claim 1, wherein the linking arm and the rotational wheel are mounted on a substrate.

3. The relative-rotation synchronous movement-aid device as claimed in claim 1, wherein the synchronous movement-aid device comprises a left linking arm and a right linking arm and a left rotational wheel and a right rotational wheel engaged with the left rotational wheel, the left linking arm and the left rotational wheel being symmetrically arranged with the right linking arm and right rotational wheel, respectively, about a central axis therebetween.

4. The relative-rotation synchronous movement-aid device as claimed in claim 2, wherein a rail is disposed on the substrate and the pivoted end of the linking arm is freely movably positioned on the rail.

5. The relative-rotation synchronous movement-aid device as claimed in claim 3, wherein the left and right linking arms and the left and right rotational wheels are arranged on a substrate, a rail being disposed on each of two sides of the substrate, the pivoted ends of the left and right linking arms being freely movably positioned on the rails.

6. The relative-rotation synchronous movement-aid device as claimed in claim 3, wherein the left rotational wheel is engaged with a left transmission wheel and the left transmission wheel is engaged with a right transmission wheel, while the right transmission wheel is engaged with the right rotational wheel.

7. The relative-rotation synchronous movement-aid device as claimed in claim 4, wherein the pivoted end has a pivot pin.

8. The relative-rotation synchronous movement-aid device as claimed in claim 5, wherein the pivoted end has a pivot pin.

9. The relative-rotation synchronous movement-aid device as claimed in claim 1, wherein the slot extends from the free end to a middle section of the linking arm and has a length about one half of the length of the linking arm.

10. The relative-rotation synchronous movement-aid device as claimed in claim 1, wherein a movable apparatus body is pivotally connected with the pivoted end of the linking arm.

11. The relative-rotation synchronous movement-aid device as claimed in claim 4, wherein the rails have a linear form.

12. The relative-rotation synchronous movement-aid device as claimed in claim 5, wherein the rails have a linear form.

13. The relative-rotation synchronous movement-aid device as claimed in claim 4, wherein the rails have an arcuate or curved form.

14. The relative-rotation synchronous movement-aid device as claimed in claim 5, wherein the rails have an arcuate or curved form.

* * * * *